United States Patent Office 2,777,851
Patented Jan. 15, 1957

2,777,851

PYRIDYL-3-METHYL PHOSPHATE AND SALTS THEREOF

Robert Frank Long and Alexander Lang Morrison, Welwyn Garden City, England, assignors to Hoffmann-La Roche Inc., Nutley, N. J., a corporation of New Jersey No Drawing. Application April 9, 1956, Serial No. 576,809

Claims priority, application Great Britain April 29, 1955

8 Claims. (Cl. 260—297)

This invention relates to a novel organic phosphate and salts thereof and to a process for the synthesis of those compounds. More particularly, the invention relates to pyridyl-3-methyl phosphate and to the alkali metal, alkaline earth metal and ammonium salts of that compound as well as a process for producing them.

The compounds of this invention are useful as vasodilators and may be used in treating peripheral vascular disorders, e. g. to relax the peripheral blood vessels. The compounds may be administered in therapeutic dosages in conventional forms, e. g. tablets or in conventional liquid vehicles.

The novel pyridyl-3-methyl phosphate and its salts are produced by the following procedure. Pyridyl-3-methyl alcohol is phosphorylated by treating with a mixture of phosphorus pentoxide and phosphoric acid at an elevated temperature. The reaction mixture is then heated in acid solution in order to hydrolyze any polyphosphates which have been formed. The hydrolyzate is passed through a sulfonic acid cation exchange resin which is then eluted with water. The pyridyl-3-methyl phosphate is isolated from the aqueous eluate by treating the latter with a precipitating agent. When it is desired to obtain an alkali metal, alkaline earth metal or ammonium salt of pyridyl-3-methyl phosphate, the eluate is reacted with ammonium hydroxide or with the appropriate alkali metal hydroxide or alkaline earth metal hydroxide prior to precipitation or concentration.

The phosphorylation of pyridyl-3-methyl alcohol with a mixture of phosphorus pentoxide and phosphoric acid may be effected at a temperature of about 60° C. A mineral acid such as hydrochloric acid may be used for the hydrolysis of any polyphosphates formed in the phosphorylation step.

Before feeding the hydrolyzate into the column containing the cation exchange resin, it is preferred to remove the bulk of inorganic material contained therein by treating it with phenol and partitioning the phenolic layer between ether and water. The resulting aqueous layer contains the product and this is then fed to the cation exchange column.

Cation exchange resins through which the reaction mixture is passed after hydrolysis with acid are sulfonic acid cation exchange resins, e. g. sulfonated, cross-linked polyvinyl arylmonovinyl aryl polymers such as described in U. S. Patent No. 2,366,007, in the acid form. A specific example of a cation exchange resin is Amberlite IR 120 (a sulfonated, cross-linked divinylbenzene-styrene polymer cation exchange resin prepared according to the method of U. S. Patent No. 2,366,007 and commercially available from Rohm and Haas Co., Philadelphia, Pennsylvania). Acetone is the preferred precipitating agent for isolation of the products from the aqueous eluate collected from the cation exchange resin. The pyridyl-3-methyl phosphate is obtained from eluate fractions displaying a characteristic ultraviolet absorption maximum at 260 m$\mu$.

The following examples illustrate the process of the invention.

Example 1

21.8 grams of pyridyl-3-methyl alcohol were added to a phosphorylating mixture made by mixing 91 grams of phosphorus pentoxide with 101 grams of 88% phosphoric acid. The mixture was stirred at 60° for 4 hours. The reaction mixture was then cooled to about 20° C. and poured slowly into a vigorously stirred mixture of 500 ml. of ethanol and 1500 ml. of ether. The product separated as an oil and was kept at 0° C. for 24 hours.

The supernatant liquid was then decanted and the oil, after washing twice with ether, was dissolved in 400 ml. of 1 N hydrochloric acid. The solution was heated on a boiling water bath for 30 minutes to hydrolyze polyphosphates formed during the reaction. The acid solution was concentrated to a volume of 100 ml. in vacuo and cautiously adjusted to pH 6 with strong aqueous ammonia.

The solution was then fed into a column (4.5 x 60 cm.) containing Amberlite IR 120 (a commercially available cation exchange resin identified above) and eluted with water at 250 ml. per hour. Eluate fractions displaying an ultraviolet absorption maximum at 260 m$\mu$ were collected and were concentrated under reduced pressure to 50 ml. Upon adding 50 ml. of acetone to the concentrate, pyridyl-3-methyl phosphate crystallized. The solution was kept at 0° for 24 hours, the product was separated, washed with 100 ml. of acetone-water mixture (1:1 by volume) and with 100 ml. of acetone, then dried in vacuo, M. P. 195–196° C.

Example 2

21.8 grams of pyridyl-3-methyl alcohol were added to a phosphorylating mixture made by mixing 91 grams of phosphorus pentoxide with 101 grams of 88% phosphoric acid. The mixture was stirred at 60° for 4 hours. The reaction mixture was then cooled to about 20° C. and poured slowly into a vigorously stirred mixture containing 500 ml. of ethanol and 1500 ml. of ether. The product separated as an oil and was kept at 0° C. for 24 hours.

The supernatant liquid was then decanted and the oil, after washing twice with ether, was dissolved in 400 ml. of 1 N hydrochloric acid. The solution was heated on a boiling water bath for 30 minutes to hydrolyze polyphosphates formed during the reaction. The acid solution was concentrated to 100 ml. in vacuo and cautiously adjusted to pH 6 with strong aqueous ammonia.

The neutralized solution was extracted 3 times with 50 ml. portions of liquified phenol (made by adding 10% by weight of water to pure phenol). The combined phenol extracts were partitioned between 750 ml. of ether and 100 ml. of water. The aqueous layer was separated and the ether layer was washed twice with 25 ml. of water. The combined aqueous solutions were washed with 250 ml. of ether and fed into a column (3 x 35 cm.) containing Amberlite IR 120 and eluted with water at 200 ml. per hour. Eluate fractions displaying an ultraviolet absorption maximum at 260 m$\mu$ were collected and were concentrated to 50 ml. under reduced pressure. Upon the addition of 50 ml. of acetone, pyridyl-3-methyl phosphate crystallized. The solution was kept at 0° C. for 24 hours. The product was then collected, washed with 100 ml. of acetone-water mixture (1:1 by volume) and 100 ml. of acetone, then dried in vacuo, M. P. 195–196° C.

Example 3

To 1.8 grams of pyridyl-3-methyl phosphate suspended in 5 ml. of water were added 10 ml. of 2 N sodium hydroxide. The pH of the resulting solution was about 8.0. 50 ml. of acetone were then added to the solution and crystalline disodium pyridyl-3-methyl phosphate precipitated.

*Example 4*

To 1.89 grams of pyridyl-3-methyl phosphate suspended in 5 ml. of water were added 5 ml. of 2 N sodium hydroxide. The pH of the resulting solution was about 5.5. 50 ml. of acetone were then added to the solution and crystalline monosodium pyridyl-3-methyl hydrogen phosphate precipitated.

We claim:

1. A compound selected from the group consisting of pyridyl-3-methyl phosphate and the alkali metal, alkaline earth metal and ammonium salts thereof.
2. Pyridyl-3-methyl phosphate.
3. Sodium salts of pyridyl-3-methyl phosphate.
4. A process which comprises phosphorylating pyridyl-3-methyl alcohol by heating with a mixture of phosphorus pentoxide and phosphoric acid at an elevated temperature, hydrolyzing the reaction mixture by heating in acid solution, passing the hydrolyzate through a sulfonic acid cation exchange resin, eluting the resin with water and precipitating pyridyl-3-methyl phosphate from the aqueous eluate.
5. A process as in claim 4 wherein hydrochloric acid is used for hydrolyzing the reaction mixture.
6. A process as in claim 4 wherein acetone is the precipitating agent.
7. A process as in claim 4 wherein the aqueous eluate is treated with a member of the group consisting of alkali metal hydroxide, alkaline earth metal hydroxide and ammonium hydroxide prior to precipitation of the product.
8. A process as in claim 7 wherein acetone is the precipitating agent.

No references cited.